(12) United States Patent
Park et al.

(10) Patent No.: US 12,255,345 B2
(45) Date of Patent: *Mar. 18, 2025

(54) BATTERY PACK COMPRISING REINFORCEMENT POLE PENETRATING INSIDE THEREOF, AND AUTOMOTIVE VEHICLE COMPRISING SAME

(71) Applicant: LG ENERGY SOLUTION, LTD., Seoul (KR)

(72) Inventors: Jhin Ha Park, Daejeon (KR); Jeong Oh Moon, Daejeon (KR); Hee Jun Jin, Daejeon (KR); Ho June Chi, Daejeon (KR); Jin Yong Park, Daejeon (KR); Kyung Woo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 517 days.

This patent is subject to a terminal disclaimer.

(21) Appl. No.: 17/635,742

(22) PCT Filed: Jul. 1, 2021

(86) PCT No.: PCT/KR2021/008318
§ 371 (c)(1),
(2) Date: Feb. 16, 2022

(87) PCT Pub. No.: WO2022/055097
PCT Pub. Date: Mar. 17, 2022

(65) Prior Publication Data
US 2022/0271398 A1 Aug. 25, 2022

(30) Foreign Application Priority Data
Sep. 8, 2020 (KR) ........................ 10-2020-0114882

(51) Int. Cl.
*H01M 50/289* (2021.01)
*H01M 50/211* (2021.01)
(Continued)

(52) U.S. Cl.
CPC ....... *H01M 50/264* (2021.01); *H01M 50/211* (2021.01); *H01M 50/242* (2021.01);
(Continued)

(58) Field of Classification Search
None
See application file for complete search history.

(56) References Cited

U.S. PATENT DOCUMENTS 10,158,106 B2 12/2018 Marpu et al.
2006/0240318 A1 10/2006 Kim et al.
(Continued)

FOREIGN PATENT DOCUMENTS

CN 103227340 A 7/2013
CN 105633312 A 6/2016
(Continued)

OTHER PUBLICATIONS

Machine translation of KR 20060134549, Dec. 2006.*
(Continued)

*Primary Examiner* — Jonathan Crepeau
(74) *Attorney, Agent, or Firm* — Birch, Stewart, Kolasch & Birch, LLP

(57) ABSTRACT

A battery cell has asymmetrically formed electrode leads, and a battery module includes the same. The spatial efficiency and the mechanical strength of the battery module are improved.

13 Claims, 9 Drawing Sheets

(51) Int. Cl.
  *H01M 50/242* (2021.01)
  *H01M 50/249* (2021.01)
  *H01M 50/264* (2021.01)
  *H01M 50/548* (2021.01)

(52) U.S. Cl.
  CPC ....... *H01M 50/249* (2021.01); *H01M 50/289* (2021.01); *H01M 50/548* (2021.01); *H01M 2220/20* (2013.01)

(56) References Cited

U.S. PATENT DOCUMENTS

| | | |
|---|---|---|
| 2011/0274955 A1 | 11/2011 | Park et al. |
| 2012/0156537 A1 | 6/2012 | Meintschel et al. |
| 2012/0261206 A1 | 10/2012 | Yasui et al. |
| 2015/0079455 A1 | 3/2015 | Chang et al. |
| 2017/0012315 A1 | 1/2017 | Kayano et al. |
| 2018/0241021 A1 | 8/2018 | Kim et al. |
| 2019/0181405 A1 | 6/2019 | Kim et al. |
| 2019/0221901 A1 | 7/2019 | Yoon et al. |
| 2019/0267682 A1 | 8/2019 | Seo et al. |
| 2020/0185672 A1 | 6/2020 | Seo et al. |
| 2020/0189378 A1 | 6/2020 | Hirsch et al. |
| 2020/0411814 A1 | 12/2020 | Ju et al. |

FOREIGN PATENT DOCUMENTS

| | | |
|---|---|---|
| CN | 109788602 A | 5/2019 |
| CN | 110165117 A | 8/2019 |
| CN | 111293253 A | 6/2020 |
| CN | 101253639 A | 12/2024 |
| JP | 2009-146796 A | 7/2009 |
| JP | 2011-171176 A | 9/2011 |
| JP | 2011-210582 A | 10/2011 |
| JP | WO2016/121928 A1 | 3/2017 |
| JP | 2017-515267 A | 6/2017 |
| JP | 2020-53303 A | 4/2020 |
| KR | 10-0612239 B1 | 8/2006 |
| KR | 10-2006-0134549 A | 12/2006 |
| KR | 10-0896134 B1 | 5/2009 |
| KR | 10-2012-0102694 A | 9/2012 |
| KR | 10-1264527 B1 | 5/2013 |
| KR | 10-2014-0090425 A | 7/2014 |
| KR | 10-1577186 B1 | 12/2015 |
| KR | 10-2017-0021631 A | 2/2017 |
| KR | 10-2017-0084501 A | 7/2017 |
| KR | 10-2018-0112617 A | 10/2018 |
| KR | 10-2019-0069873 A | 6/2019 |
| KR | 10-2019 0074759 A | 6/2019 |
| KR | 10-2027124 B1 | 10/2019 |
| KR | 10-2067232 B1 | 12/2019 |
| KR | 10-2065099 B1 | 1/2020 |
| WO | WO 2007/027058 A1 | 3/2007 |
| WO | WO 2017/217641 A1 | 12/2017 |
| WO | WO 2020/138821 A1 | 7/2020 |

OTHER PUBLICATIONS

Extended European Search Report for corresponding European Application No. 21854856.8, dated Feb. 2, 2023.
Japanese Notice of Reasons for Refusal for Japanese Application No. 2022-510843, dated Mar. 20, 2023, with an English translation.
Japanese Notice of Allowance for Japanese Application No. 2022-510843, dated Nov. 20, 2023, with English translation.

* cited by examiner

[FIG. 1]
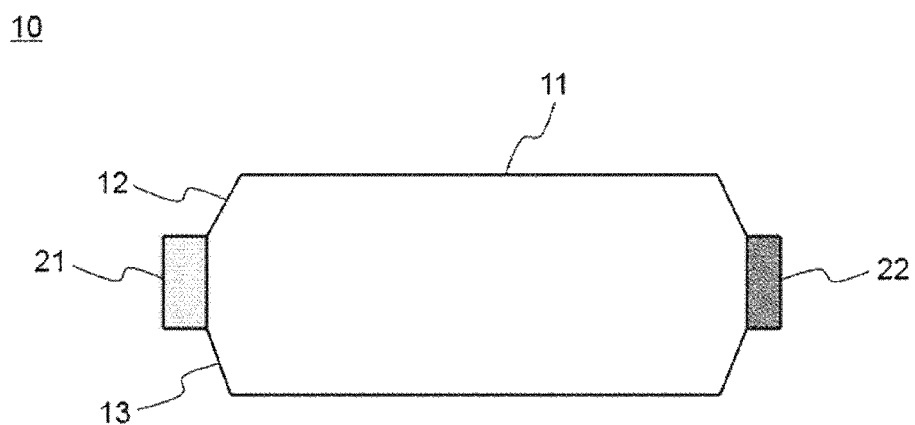
Conventional Art

[FIG. 2]
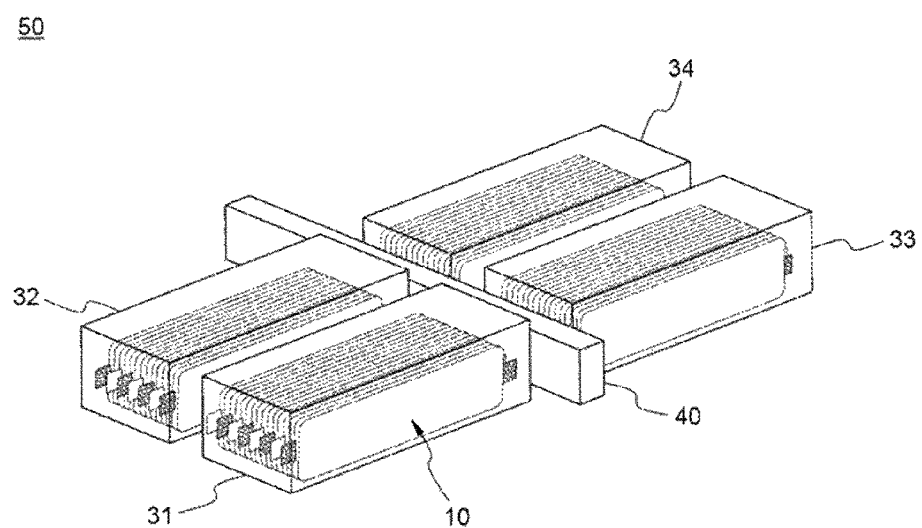
Conventional Art

[FIG. 3]
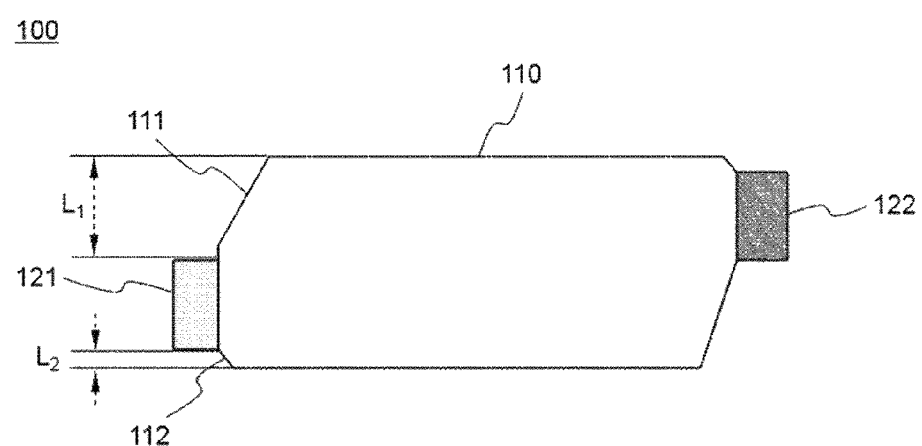

[FIG. 4]
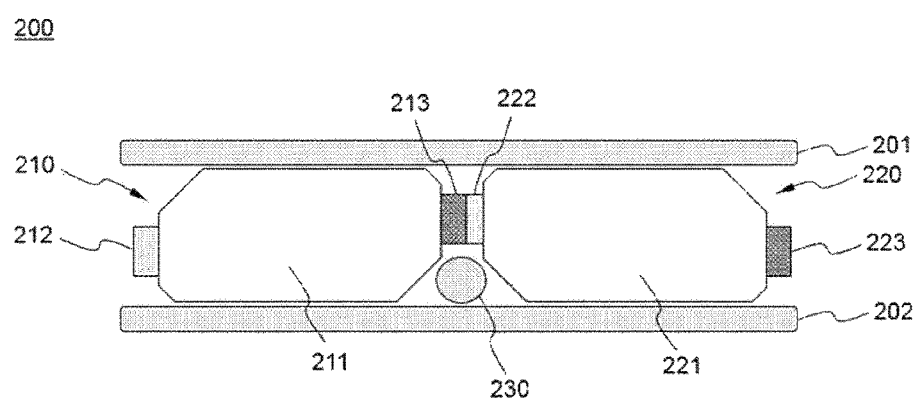

[FIG. 5]
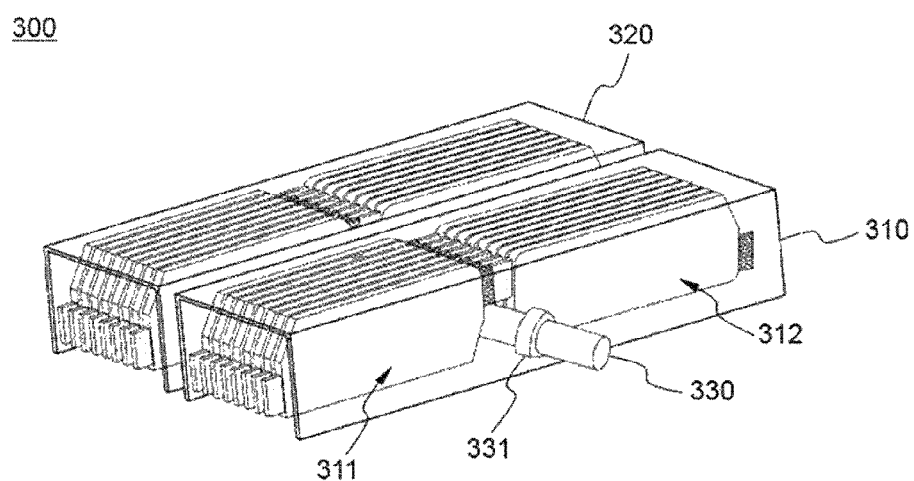

[FIG. 6]
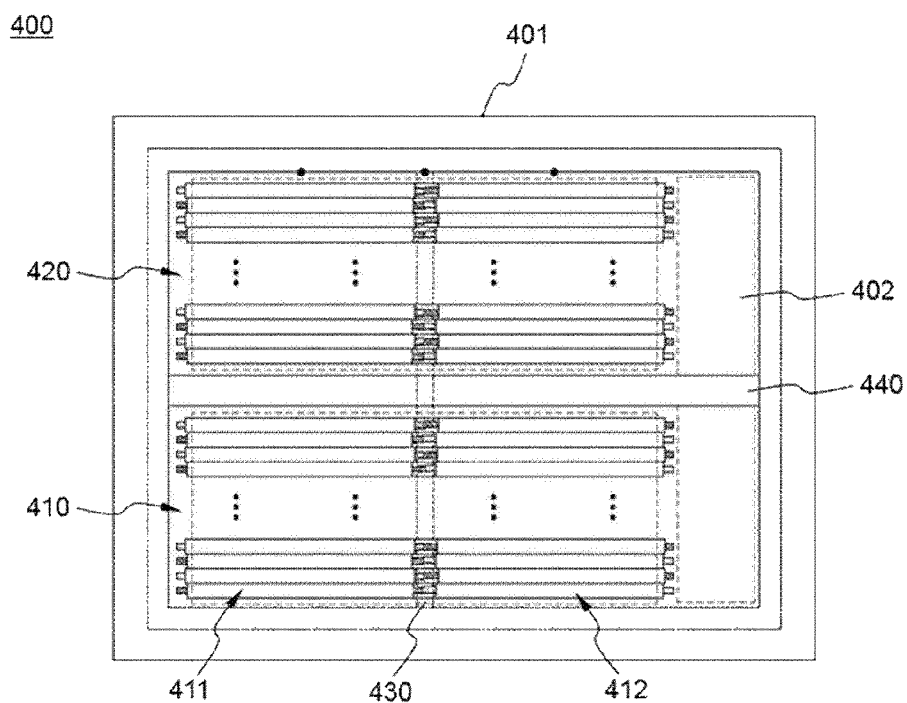

[FIG. 7]
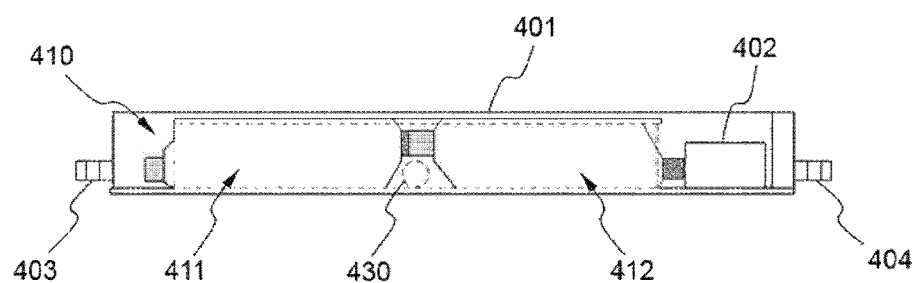

[FIG. 8]
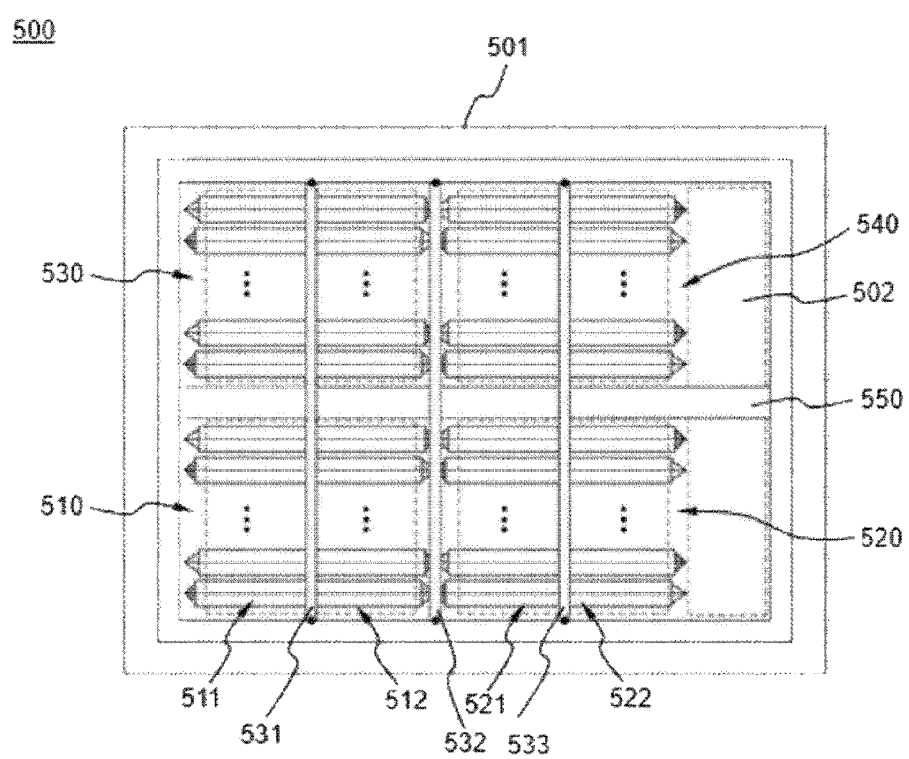

[FIG. 9]
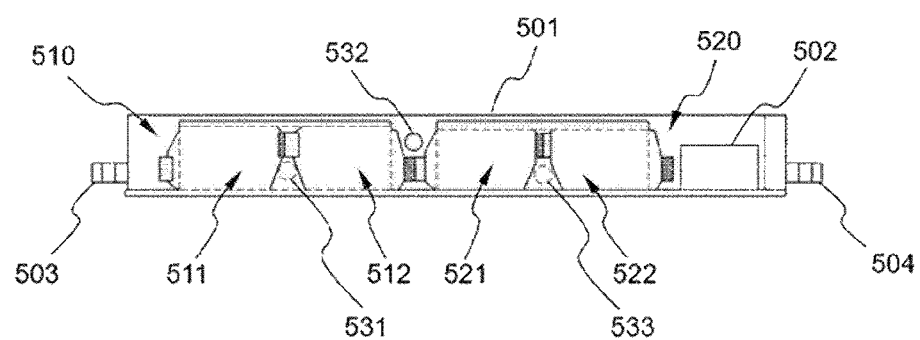

BATTERY PACK COMPRISING REINFORCEMENT POLE PENETRATING INSIDE THEREOF, AND AUTOMOTIVE VEHICLE COMPRISING SAME

TECHNICAL FIELD

This application claims the benefit of priority based on Korean Patent Application No. 10-2020-00114882, filed on Sep. 8, 2020, and the entire contents of the Korean patent application are incorporated herein by reference.

The present invention relates to a battery pack including battery cells, where electrode leads are asymmetrically formed, and a reinforcing pole penetrating the inside of a battery pack, and a vehicle including the battery pack as a power source.

BACKGROUND ART

In recent years, as the price of energy sources increases due to the depletion of fossil fuels and the interest of environmental pollution is amplified, the demand for environmentally friendly alternative energy sources has become an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

Such a pouch-type battery is formed in a structure such that an electrode assembly including a positive electrode, a negative electrode, and a separator disposed therebetween is built in a case, and positive and negative electrode tabs are respectively joined to electrode leads and are sealed to be exposed to the outside of the case. The electrode leads are electrically connected to the external device through contact with the external device, and the battery supplies power to the external device through the electrode leads or receives power from the external device.

However, when a battery module is formed by combination of a plurality of battery cells, a pouch-type battery has a limitation that the spatial efficiency is not good due to the protruding electrode lead, a terrace region formed during the sealing process, etc. Further, a separate space for forming a reinforcing bar is required to improve the mechanical strength of a battery module.

FIG. 1 shows a conventional battery cell. As illustrated in FIG. 1, the conventional pouch-type battery cell has a structure where a first electrode lead 21 and a second electrode lead 22 protrude at two side surfaces on the basis of the cell body 11 having an electrode assembly. Specifically, the side surface, where the first electrode lead 21 of the cell body 11 is formed, has a structure having shoulder lines 12 and 13, in which the height of the cell body 11 gradually decreases toward the external ends in the width direction of the battery cell 10 on the basis of the first electrode lead 21. Further, shoulder lines are also formed in both width directions based on the second electrode lead 22.

FIG. 2 shows a structure in which a battery pack 50 is formed by combining the battery cells 10 shown in FIG. 1. Referring to FIG. 2, 4 battery modules 31, 32, 33 and 34, where a multiple of battery cells 10 are accommodated, are combined to form one battery pack 50. In this case, a reinforcing bar 40 is formed to increase the mechanical strength inside the battery pack 50. The reinforcing bar 40 is formed at a position across a space between battery modules 31 and 32 located on the left side and battery modules 33 and 34 located on the right side. The conventional battery pack 50 requires a separate space for forming this reinforcing bar 40, which lowers the space utilization rate.

Therefore, a new technology for improving mechanical strength while increasing the spatial efficiency at the time of assembling a battery pack is required.

PRIOR ART LITERATURE

Patent Document (Patent Document 1) Korean Patent Publication No. 2019-0069873

DISCLOSURE

Technical Problem

The present invention has been devised to solve the above problems of the prior art, and an object of the present invention is to provide a technology for improving mechanical strength while increasing the spatial efficiency in the process of forming a battery pack using pouch-type battery cells.

Technical Solution

The present invention provides a battery pack including battery cells, where electrode leads are asymmetrically formed, and a reinforcing pole penetrating the battery cells. In one example, a battery pack according to the present invention includes: a pack case having a receiving portion; a plurality of battery cells which are oriented in a first direction and are accommodated in the receiving portion of the pack case; and a reinforcing pole for reinforcing mechanical strength of an inside of the pack case. Herein, each of the battery cells includes a cell body; and first and second electrode leads which protrude in opposite directions on a basis of the cell body, wherein the first and second electrode leads leaned to opposite external ends of a central axis in a longitudinal direction of each of the battery cells, wherein the first and second electrode leads are offset relative to each of the battery cells, and m cell laminate blocks, each of which is obtained by lamination of a plurality of battery cells, are formed in the first direction, wherein the m is an integer equal to or greater than 2, wherein a second electrode lead of a p-th cell laminate block and a first electrode lead of a (p+1)-th cell laminate block are joined at a position facing each other in the battery cells, wherein the p is an integer between 1 and (m−1). Further, the reinforcing pole is disposed in a direction perpendicular to a direction in which the battery cells are oriented, and wherein the reinforcing pole a dead space adjacent to a portion where the second electrode lead of the p-th cell laminate block and the first electrode lead of the (p+1)-th cell laminate block are joined.

In one example, the battery pack has a structure where two or more battery modules are accommodated in a direction in which the accommodated battery cells are oriented. Further, the reinforcing pole is disposed at one or more of a boundary region between a battery cell and a battery cell; and a boundary region between a battery module and a battery module.

In a specific example, b cell laminate blocks, each of which is obtained by lamination of a plurality of battery cells, are formed in a direction in which the accommodated battery cells are oriented (the b is an integer between 2 and m), a second electrode lead of a q-th cell laminate block and a first electrode lead of a (q+1)-th cell laminate block are joined at a position facing each other (the q is an integer between 1 and (b−1)), and the reinforcing pole is disposed in a direction perpendicular to a direction in which the battery cells are oriented, and the reinforcing pole a dead space adjacent to a portion where the second electrode lead of the q-th cell laminate block and the first electrode lead of the (q+1)-th cell laminate block are joined.

In another specific example, the battery pack includes c battery modules arranged in a direction in which the accommodated battery cells are oriented, wherein the c is an integer between 2 and m, a second electrode lead at an end portion of a r-th battery module and a first electrode lead at an end portion of a (r+1)-th battery module are joined at a position where the second electrode lead and the first electrode lead face each other, wherein the r is an integer between 1 and (c−1), and the reinforcing pole is disposed in a direction perpendicular to a direction in which the battery cells are oriented, and wherein the reinforcing pole a dead space adjacent to a portion where the second electrode lead at the end portion of the r-th battery module and the first electrode lead at the end portion of the (r+1)-th battery module are joined.

In one example, the battery pack has a structure where two or more battery modules are accommodated in a direction in which the reinforcing pole is formed, and the reinforcing pole penetrates the two or more battery modules.

In another example, the battery pack further includes a reinforcing bar disposed in a direction perpendicular to a direction in which the reinforcing pole is formed.

In a specific example, a cross-section of the reinforcing pole has a circular, elliptical, or triangle shape. Further, a cross-section of the reinforcing bar has a quadrangle or trapezoidal shape.

In one example, the battery pack further includes first and second battery modules disposed in a direction perpendicular to a direction in which the accommodated battery cells are oriented, and the reinforcing pole penetrates the first and second battery modules.

In another example, the battery pack further includes a reinforcing bar which is disposed between the first and second battery modules, and is positioned in a direction perpendicular to the reinforcing pole.

In another example, the battery pack includes: first and second battery modules arranged in a direction perpendicular to a direction in which the accommodated battery cells are oriented; and third and fourth battery modules arranged in parallel to the first and second battery modules, respectively. Further, the reinforcing pole is disposed to penetrate the first and third battery modules, penetrate the second and fourth battery modules, or pass a position between the first and second battery modules and a position between the third and fourth battery modules.

In a specific example, the battery pack further includes a reinforcing bar which is disposed to pass a position between the first and third battery modules and a position between the second and fourth battery modules.

In one example, the battery pack further includes a battery management system (BMS) located inside the battery pack.

Further, the present invention provides a vehicle including the above-described battery pack as a power source.

Advantageous Effects

According to the battery pack of the present invention, the spatial efficiency is excellent, and the mechanical strength is improved. The battery pack can be utilized as a power source for a vehicle, etc.

BRIEF DESCRIPTION OF THE DRAWINGS

FIG. 1 is a schematic diagram showing a conventional battery cell.

FIG. 2 is a schematic diagram showing a conventional battery module.

FIG. 3 is a schematic diagram showing a battery cell according to one embodiment of the present invention.

FIG. 4 is a schematic diagram showing a cross-sectional structure of a battery module according to another embodiment of the present invention.

FIG. 5 is a schematic diagram showing a structure of a battery pack according to another embodiment of the present invention.

FIGS. 6 and 7 are a schematic diagram showing a structure of a battery pack, and its cross-sectional diagram according to another embodiment of the present invention.

FIGS. 8 and 9 are a schematic diagram showing a structure of a battery pack, and its cross-sectional diagram according to another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention provides a battery pack which has an improved mechanical strength and uses the minimized space for reinforcement of mechanical strength. In one example, a battery pack according to the present invention includes: a pack case having a receiving portion; a plurality of battery cells which are oriented in one direction and are accommodated in the receiving portion of the pack case; and a reinforcing pole for reinforcing mechanical strength of an inside of the pack case. Each of the battery cells includes a cell body; and first and second electrode leads which protrude in opposite directions on a basis of the cell body, in which the first and second electrode leads leaned to opposite external ends on a basis of a central axis in a longitudinal direction of each of the battery cells.

In general, in pouch-type battery cells, a dead space is generated due to formation of electrode leads, which lowers the spatial efficiency. The present invention provides battery cells of a new structure capable of a dead space according to formation of electrode leads. The pouch-type battery cell applied to the present invention has a structure where first and second electrode leads are asymmetric to each other.

In one embodiment, a pouch-type battery cell according to the present invention includes: a cell body for accommodating an electrode assembly; a first electrode lead which is formed in a manner that protrudes in one direction of the cell body; and a second electrode lead which is formed in a manner that protrudes in a direction opposite to a direction in which the first electrode lead of the cell body is formed. Specifically, the electrode assembly includes a positive electrode, a negative electrode, and a separator interposed between the positive electrode and the negative electrode. Further, the pouch-type battery cell has a structure where an electrode assembly is sealed by a pouch-type case, and first and second electrode leads protrude in opposite directions.

Further, in the pouch-type battery cell, the first electrode lead forms a dead space on one side surface by being leaned to the other side surface direction, on a basis of a central axis in a longitudinal direction of the battery cell. At the same time, the second electrode lead forms a dead space on one side surface by being leaned to an opposite direction of that of the first electrode lead, on a basis of the central axis in the longitudinal direction of the battery cell. The conventional battery cells have a symmetric structure where electrode leads are respectively formed on the central portion of one side surface and the other side surface, but the pouch-type battery cell according to the present invention has an asymmetric structure where respective electrode leads are leaned in one direction, and the first and second electrode leads are leaned in opposite directions.

In one example, the cell body has a structure in which heights of shoulder lines decrease toward external ends in a width direction, based on the first and second electrode leads. The heights of the shoulder lines decrease toward the external ends from the electrode lead, and the heights may sequentially or continuously decrease. For example, the first electrode lead is leaned to the left side, and in this case, the shoulder line at the right side is long, and the shoulder line at the left side is short. The shoulder line formed at the right side may have a straight line structure having a section where the height gradually decreases, and the shoulder line formed at the left side may have a curved line structure of a convex shape, having a section where the height decreases.

In a specific example, a ratio of lengths of the shoulder lines, which are formed at both sides of the first and second electrode leads in the width direction, respectively, is in a range of 1:2 to 1:10. Specifically, in the cell body, the ratio of width direction lengths of shoulder lines formed at both sides in the width direction on the basis of the first and second electrode leads may be in a range of 1:2 to 1:10, 1:3 to 1:10, 1:5 to 1:10, or 1:3 to 1:6. For example, the first electrode lead is leaned to the left side, and in this case, the shoulder line at the right side is long, and the shoulder line at the left side is short. In this case, the shoulder line formed at the left side needs to have the minimum width for sealing the edge portion, and the shoulder line formed at the right side has a wide width to secure a sufficient dead space.

Herein, m cell laminate blocks, each of which is obtained by lamination of a plurality of battery cells, are formed in a direction in which the accommodated battery cells are oriented in the battery cells (the m is an integer equal to or greater than 2), and a second electrode lead of a p-th cell laminate block and a first electrode lead of a (p+1)-th cell laminate block are joined at a position facing each other in the battery cells (the p is an integer between 1 and (m−1)). In a specific example, m cell laminate blocks may be arranged in the x-axis direction (direction in which accommodated battery cells are oriented), and the second electrode lead of a p-th cell laminate block may contact the first electrode lead of a (p+1)-th cell laminate block at a position facing each other, and the second electrode lead and the first electrode lead are electrically connected in series. Specifically, the cell laminate block disposed in the x-axis direction are electrically connected in series and satisfy the voltage level required in the battery module. For example, a p-th cell laminate block is disposed so that the second electrode lead is leaned to the upper side based on the vertically accommodated position, and a (p+1)-th cell laminate block is disposed so that the first electrode lead is also leaned to the upper side. In this case, the second electrode lead of the p-th cell laminate block and the first electrode lead of the (p+1)-th cell laminate block face each other at the same height, and two electrode leads contact each other and are electrically connected in series. The m is an integer of 2 or more. For example, the m is an integer in the range of 2 to 10.

Further, the reinforcing pole is disposed in a direction perpendicular to a direction in which the battery cells are oriented, and wherein the reinforcing pole a dead space adjacent to a portion where the second electrode lead of the p-th cell laminate block and the first electrode lead of the (p+1)-th cell laminate block are joined. Specifically, an empty space for allowing the reinforcing pole to pass while dead spaces of the two cell laminate blocks meet is formed at the lower side of a point where the second electrode lead of the p-th cell laminate block and the first electrode lead of the (p+1)-th cell laminate block contact.

In one embodiment, 2 to 10 cell laminate blocks are disposed in the x-axis direction (direction in which accommodated battery cells are oriented). Further, each cell laminate block has a structure obtained by lamination of 5 to 50 battery cells. Specifically, 2 to 4 cell laminate blocks are arranged in the x-axis direction, and each cell laminate block is obtained by lamination of 10 to 30 battery cells. For example, the battery pack according to the present invention may have a structure where 2 battery modules are arranged in the y-axis direction (perpendicular to the x-axis direction), and each battery module may have a structure where 2 cell laminate blocks, each of which is obtained by lamination of 24 battery cells, are arranged in the x-axis direction. In this case, the battery pack may have a structure of including a total of 96 battery cells by including 2 battery modules, each of which includes 48 battery cells.

In another embodiment, the battery pack according to the present invention has a structure where 2 or more battery modules are accommodated in a direction (x-axis direction) in which the accommodated battery cells are oriented. Further, the reinforcing pole is disposed at one or more of a boundary region between a battery cell and a battery cell; and a boundary region between a battery module and a battery module. Specifically, the reinforcing pole may be located in a dead space between battery cells in the battery module or in a dead space between battery modules. For example, when one battery module is disposed in the x-axis direction, the battery pack includes one reinforcing pole disposed in a dead space between battery cells in the battery module. In another example, when 2 battery modules are arranged in the x-axis direction, each reinforcing pole is positioned in each battery module, and another reinforcing pole is positioned in a dead space between battery modules. As such, the battery pack includes a total of 3 reinforcing poles.

In one embodiment, in the battery pack according to the present invention, b cell laminate blocks, each of which is obtained by lamination of a plurality of battery cells, are formed in each battery module in a direction in which the accommodated battery cells are oriented (the b is an integer between 2 and m), and a second electrode lead of a q-th cell laminate block and a first electrode lead of a (q+1)-th cell laminate block are joined at a position facing each other (the q is an integer between 1 and (b−1)). Further, the reinforcing pole is disposed in a direction perpendicular to a direction in which the battery cells are oriented, and wherein the reinforcing pole a dead space adjacent to a portion where the second electrode lead of the q-th cell laminate block and the first electrode lead of the (q+1)-th cell laminate block are joined (the q is an integer between 1 and (b−1)). In the present embodiment, a structure of including a reinforcing pole penetrating each battery module is shown. In the present invention, each battery module includes two or more cell laminate blocks, and a reinforcing pole passes through a space between the cell laminate blocks. A cell laminate block is electrically connected to its adjacent cell laminate block by electric connection between electrode leads of the cell laminate blocks. As such, it is difficult to secure a sufficient space for forming a reinforcing body. In the present invention, it is possible to secure a sufficient dead space by forming the electrode leads of a pouch-type battery cell to have an asymmetric structure. As such, the battery module according to the present invention has a reinforcing pole for enhancing the mechanical strength in the battery module.

In another embodiment, the battery pack includes c battery modules arranged in a direction in which the accommodated battery cells are oriented (the c is an integer between 2 and m), and a second electrode lead at an end portion of a r-th battery module and a first electrode lead at an end portion of a (r+1)-th battery module are joined at a position where the second electrode lead and the first electrode lead face each other (the r is an integer between 1 and (c−1)). Further, the reinforcing pole is disposed in a direction perpendicular to a direction in which the battery cells are oriented, and wherein the reinforcing pole a dead space adjacent to a portion where the second electrode lead at the end portion of the r-th battery module and the first electrode lead at the end portion of the (r+1)-th battery module are joined (the r is an integer between 1 and c−1). In the present embodiment, the battery pack includes a plurality of battery modules in one direction (x-axis direction) and includes a reinforcing pole penetrating a space between battery modules. In the present invention, the battery pack includes two or more battery modules in the x-axis direction and includes a reinforcing pole penetrating a space between battery modules. A battery module is connected to its adjacent battery module by electric connection of their electrode leads. As such, the conventional battery pack requires a separate space for forming a reinforcing body. In the present invention, a sufficient dead space was secured at a portion where electrode leads are joined, between battery modules, by applying pouch-type battery cells where electrode leads are asymmetrically formed. As such, the battery pack according to the present invention can include a reinforcing pole for enhancing mechanical strength between battery modules without using a separate space.

In one example, the battery pack has a structure where two or more battery modules are accommodated in a direction in which the reinforcing pole is formed, and the reinforcing pole penetrates the two or more battery modules. The direction in which the reinforcing pole is formed is a direction (y-axis direction) perpendicular to a direction (x-axis direction) in which the accommodated battery cells are oriented. The present invention provides two or more battery modules arranged in parallel to each other, and the reinforcing pole penetrates the two or more battery modules arranged in parallel. Through this, the mechanical strength in the y-axis direction of the battery pack can be enhanced.

In another example, the battery pack further includes a reinforcing bar disposed in a direction perpendicular to a direction in which the reinforcing pole is formed. The battery pack includes two or more battery modules arranged in parallel to each other, and a reinforcing bar is arranged between the battery modules in the y-axis direction. The mechanical strength in the x-axis direction of the battery pack can be enhanced by forming the reinforcing bar.

In one example, a cross-section of the reinforcing pole has a circular, elliptical, or triangle shape. It is possible to effectively penetrate a dead space adjacently formed on the connection portion between electrode leads of the battery cell, compared to the case of having a simple quadrangle cross-sectional structure. For example, the cross-section of the reinforcing pole has a circular shape. In addition, the cross-sectional shape of the reinforcing bar is not particularly limited, and it may be a rectangular or trapezoidal shape. The reinforcing bar is arranged between the battery modules in parallel. For example, by forming the reinforcing bar to have a quadrangle cross-sectional shape, the mechanical strength can be improved, and generation of a gap at the position can be prevented.

In a specific example, the battery pack further includes first and second battery modules disposed in a direction perpendicular to a direction in which the accommodated battery cells are oriented, and the reinforcing pole penetrates the first and second battery modules. For example, the battery pack has a structure where 2 battery modules are arranged in the y-axis direction, and the reinforcing pole penetrates the two battery modules. In a specific example, the battery pack further includes a reinforcing bar which is disposed between the first and second battery modules, and is positioned in a direction perpendicular to the reinforcing pole. The reinforcing bar is oriented in the y-axis direction and is arranged between the first and second battery modules. for example, the battery pack includes two battery modules, and the two battery modules are arranged in parallel to each other.

In a specific example, the battery pack includes: first and second battery modules arranged in a direction perpendicular to a direction in which the accommodated battery cells are oriented; and third and fourth battery modules arranged in parallel to the first and second battery modules, respectively. The reinforcing pole is disposed to penetrate the first and third battery modules, penetrate the second and fourth battery modules, or pass a position between the first and second battery modules and a position between the third and fourth battery modules. For example, the battery pack has a structure where 2 battery modules are arranged in the x-axis direction, and 2 battery modules are arranged in the y-axis direction. In this case, the battery pack has 2 reinforcing poles penetrating the battery module in the y-axis direction and 1 reinforcing pole penetrating a space between battery modules in the y-axis direction. In a specific example, the battery pack further includes a reinforcing bar which is disposed to pass a position between the first and third battery modules and a position between the second and fourth battery modules. As such, the battery pack includes 3 reinforcing poles for enhancing the mechanical strength in the y-axis direction and 1 reinforcing bar for enhancing the mechanical strength in the x-axis direction.

The battery pack further includes a battery management system (BMS) located inside the battery pack as necessary.

Further, the battery pack according to the present invention is applicable to various types of energy storage devices and power sources. For example, the energy storage device is an Energy Storage System (ESS) that stores a large amount of electrical energy. In addition, the power source is applicable to the power source of a moving means such as a vehicle. The vehicle refers to any type of vehicle which uses secondary batteries as its auxiliary power source or main power source. Specifically, the vehicle includes a hybrid (HEV), a plug-in hybrid (PHEV), or a pure electric car (BEV, EV), and the like.

DETAILED DESCRIPTION OF THE PREFERRED EMBODIMENTS

Hereinafter, the present invention will be described in more detail through drawings and examples. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

FIG. 3 is a schematic view of a battery cell according to an embodiment of the present invention. Referring to FIG. 3, the battery cell 100 according to the present invention is a pouch-type battery cell 100 having a structure where first and second electrode leads 121 and 122 are asymmetrically formed. The battery cell 100 includes: a cell body 110 for accommodating an electrode assembly; a first electrode lead 121 which is formed in a manner that protrudes in one direction of the cell body 110; and a second electrode lead 122 which is formed in a manner that protrudes in a direction opposite to a direction in which the first electrode lead 121 of the cell body 110 is formed.

In the battery cell 100, the first electrode lead 121 is leaned to the lower side, and the second electrode lead 122 is leaned to the upper side. Specifically, the cell body 110 has a structure having shoulder lines 111 and 112, in which the heights of the shoulder lines 111 and 112 gradually decrease toward both external ends in the width direction, based on the first electrode lead 121. The shoulder lines 111 and 112 have a structure where the heights of the shoulder lines 111 and 112 gradually decrease in the external direction from the electrode lead. For example, referring to FIG. 3, the first electrode lead 121 is leaned toward the lower side. In this case, a relatively large dead space is secured on the upper side as the shoulder line 111 is formed long, and a relatively small dead space is secured on the lower side as the shoulder line 112 is formed short.

In the cell body 110, the ratio of lengths of the shoulder lines 111 and 112, which are formed at both sides of the first electrode lead 121 in the width direction, respectively, may be about 5:1. Further, in the cell body 110, the ratio of lengths of the shoulder lines, which are formed at both sides of the first electrode lead 122 in the width direction, respectively, may also be about 1:5. Likewise, in the battery cell 100 according to the present invention, it is possible to secure a larger area of a dead space by forming electrode leads 121 and 122 to be leaned in a side surface direction. Further, the first electrode lead 121 and the second electrode lead 122 form an asymmetric structure by being leaned in different side surface directions.

Second Embodiment

FIG. 4 is a schematic diagram showing a cross-section of a battery module according to another embodiment of the present invention. Referring to FIG. 4, the battery module 200 according to the present invention has a structure in which cell laminates 210 and 220, which are obtained by lamination of a plurality of battery cells, are accommodated in module housings 201 and 202. The module housing includes a U-shaped frame 202 (the side portion is omitted), and a module housing upper plate 201 covering the upper surface of the U-shaped frame 202. FIG. 4 shows only a module housing lower plate 202 in the U-shaped frame 202 for the convenience of explanation.

Two cell laminates 210 and 220 are disposed in the x-axis direction in the battery module 200, and each cell laminate 210 or 220 has a structure (not shown) where 24 battery cells are laminated in the y-axis direction. Therefore, 48 battery cells are accommodated in the battery module 200. Referring to FIG. 4, the cell laminate 210 formed on the left side has the first electrode lead 212 at the left lower side, and the second electrode lead 213 at the right upper side. Further, the cell laminate 220 formed on the right side has the first electrode lead 222 at the left upper side, and the second electrode lead 223 at the right lower side.

Further, the battery module 200 has a reinforcing pole 230 which penetrates a space between the cell laminates 210 and 220 in order to reinforce the mechanical strength. The reinforcing pole 230 is arranged to penetrate the dead space between the cell laminate 210 and the cell laminate 220 arranged in the X-axis direction. Specifically, in the battery module 200, the second electrode lead 213 of the left cell laminate 210 disposed in the x-axis direction contact the first electrode lead 222 of the right cell laminate 220 while facing each other, and the second electrode lead 213 and the first electrode lead 222 are electrically connected in series. The second electrode lead 213 of the left cell laminate 210 is leaned to the upper side, and the first electrode lead of the right cell laminate 220 is also leaned to the upper side. In this case, the second electrode lead 220 of the left cell laminate 210 and the first electrode lead 222 of the right cell laminate 220 are electrically connected while facing each other at the same height, and a dead space of a large area is formed at the lower side. The reinforcing pole 230 penetrates through the dead space.

Likewise, the battery module 200 according to the present invention does not require an additional space for forming the reinforcing pole 230, and it is possible to simultaneously implement a high mechanical strength as well as excellent spatial utilization.

Third Embodiment

FIG. 5 is a schematic diagram showing a battery pack according to another embodiment of the present invention. Referring to FIG. 5, a battery pack 300 according to the present invention has a structure where 2 battery modules 310 and 320 are combined. Two cell laminates 311 and 312 are disposed in the x-axis direction in each battery module 310 or 320, and each cell laminate 311 or 312 has a structure where 24 battery cells are laminated in the y-axis direction. Further, respective battery cells of the cell laminate 311 at the left side and the cell laminate 312 at the right side are electrically connected to each other in series. Further, in the battery pack 300, the reinforcing pole 330 penetrates a dead space between the cell laminate 311 on the left side and the cell laminate 312 on the right side, and penetrates 2 battery modules 310 and 320 disposed in the y-axis direction. The position of the reinforcing pole 330 is fixed by the reinforcing pole stopper 331.

Further, each of the battery modules 310 and 320 has a structure where its front and rear side surfaces and upper surface are covered by a U-shaped frame. It is possible to further include a lower plate (not shown) as necessary.

Fourth Embodiment

FIGS. 6 and 7 are schematic diagrams showing a battery pack according to one embodiment of the present invention. Referring to FIG. 6, a battery pack 400 according to the present invention includes first and second battery modules 410 and 420 arranged in parallel to each other in a pack case 410, and a battery management system (BMS) is formed at one side of the battery pack 400. Specifically, the first battery module 410 at the lower end of FIG. 6 includes two cell laminates 411 and 412 disposed in the x-axis direction. The first battery module 410 has 2 cell laminates 411 and 412 disposed in the x-axis direction, and each of the cell laminates 411 and 412 includes 24 battery cells. Further, the electrode leads of the battery cells forming the cell laminate 411 at the left side are electrically connected to the electrode leads of the battery cells forming the cell laminate 412 at the right side in series. The second battery module 420 shown at the upper end of FIG. 6 is also formed in the same structure.

Further, a reinforcing pole 430 passes through a dead space between the cell laminates 411 and 412 of the first battery module, and the reinforcing pole 430 penetrates both the first and second battery modules 410 and 420. The first and second battery modules 410 and 420 are arranged in parallel to each other, and the reinforcing bar 440 is positioned between the first and second battery modules 410 and 420. The reinforcing pole 430 enhances the mechanical strength of the battery pack in the x-axis direction, and the reinforcing bar 440 enhances the mechanical strength of the battery pack in the y-axis direction.

FIG. 7 shows a cross-sectional structure of the battery pack shown in FIG. 6. Referring to FIG. 7, two cell laminates 411 and 412 are arranged in the x-axis direction, based on the first battery module 410 accommodated in the pack case 401, and are electrically connected to each other in series. The reinforcing pole 430 is disposed through a dead space between the two cell laminates 411 and 412. Further, a battery management system (BMS) 402 is positioned at the right side of the inside of the battery pack 400. Pack terminals 403 and 404 for electric connection to the outside may be formed at the right and left sides of the battery pack 401.

Fifth Embodiment

FIGS. 8 and 9 are schematic diagrams showing a battery pack according to another embodiment of the present invention. Referring to FIG. 8, the battery pack 500 according to the present invention has a structure where 4 battery modules 510, 520, 530 and 540 are accommodated in a pack case 501 in a 2×2 form. The first and second battery modules 510 and 520 are electrically connected to each other in series, and the third and fourth battery modules 530 and 540 are electrically connected to each other in series. Further, the first and second battery modules 510 and 520 and the third and fourth battery modules 530 and 540 are arranged in parallel to each other. Each of the four battery modules 510, 520, 530 and 540 has a structure where two cell laminates are accommodated in the x-axis direction, and 24 battery cells are laminated in one cell laminate.

Specifically, in the battery pack 500, reinforcing poles 531, 532 and 533 are positioned at a position of penetrating the first and third battery modules 510 and 530; a position of penetrating the second and fourth battery modules 520 and 540; and a position between the first and second battery modules 510 and 520 and the third and fourth battery modules 530 and 540, respectively. Further, the reinforcing bar 550 is disposed at a position of passing a space between the first and third battery modules 510 and 530 and passing a space between the second and fourth battery modules 520 and 540.

Further, a battery management system (BMS) 502 is positioned at the inside of the pack case 501 of the battery pack 500.

FIG. 9 shows a cross-sectional structure of the battery pack shown in FIG. 8. Referring to FIG. 9, the battery pack 500 includes first and second battery modules 510 and 520 accommodated in the x-axis direction inside the pack case 501. The first battery module includes 2 cell laminates 511 and 512, and the second battery module includes 1 cell laminates 521 and 522. The reinforcing pole 531 is positioned at a dead space between 2 cell laminates 511 and 512 in the first battery module 510, and the reinforcing pole 533 is positioned at a dead space between two cell laminates 521 and 522 in the first battery module 520. Further, the reinforcing pole 532 is positioned at a dead space between the first battery module 510 and the second battery module 520, too.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS 10, 100: battery cell
210, 220, 311, 312, 411, 412, 511, 512, 521, 522: cell laminate
11, 110, 211, 221: cell body
12, 13, 111, 112: shoulder line
21, 121, 221: first electrode lead
22, 122, 222: second electrode lead
31, 31, 33, 34, 200, 310, 320, 410, 420, 510, 520, 530, 540: battery module
40, 440, 550: reinforcing bar
50, 300, 400, 500: battery pack
301: upper plate of module housing
302: lower plate of module housing
230, 330, 430, 531, 532, 533: reinforcing pole
331: reinforcing pole stopper
401, 501: pack case
402, 502: BMS
403, 404, 503, 504: pack terminal

The invention claimed is:
1. A battery pack comprising:
a pack case having a receiving portion;

a plurality of battery cells which are oriented in a first direction and are accommodated in the receiving portion of the pack case; and a reinforcing pole for reinforcing mechanical strength of an inside of the pack case, wherein each of the battery cells includes:
   a cell body; and
   first and second electrode leads which protrude in opposite directions of the cell body,
   wherein the first and second electrode leads are offset relative to each of the battery cells, wherein m cell laminate blocks, each of which is obtained by lamination of a plurality of battery cells, are formed in the first direction, wherein the m is an integer equal to or greater than 2, wherein a second electrode lead of a p-th cell laminate block and a first electrode lead of a (p+1)-th cell laminate block are joined at a position facing each other in the battery cells, wherein the p is an integer between 1 and (m−1), wherein the reinforcing pole is disposed in a direction perpendicular to the first direction, and wherein the reinforcing pole occupies a dead space adjacent to a portion where the second electrode lead of the p-th cell laminate block and the first electrode lead of the (p+1)-th cell laminate block are joined.

2. The battery pack of claim 1, wherein the battery pack has a structure where two or more battery modules are accommodated in a direction in which the accommodated battery cells are oriented, and
   wherein the reinforcing pole is disposed at one or more of a boundary region between a battery cell and a battery cell; and a boundary region between a battery module and a battery module.

3. The battery pack of claim 1, wherein b cell laminate blocks, each of which is obtained by lamination of a plurality of battery cells, are formed in a direction in which the accommodated battery cells are oriented,
   wherein the b is an integer between 2 and m,
   wherein a second electrode lead of a q-th cell laminate block and a first electrode lead of a (q+1)-th cell laminate block are joined at a position facing each other, wherein the q is an integer between 1 and (b−1),
   wherein the reinforcing pole is disposed in a direction perpendicular to a direction in which the battery cells are oriented, and
   wherein the reinforcing pole occupies a dead space adjacent to a portion where the second electrode lead of the q-th cell laminate block and the first electrode lead of the (q+1)-th cell laminate block are joined.

4. The battery pack of claim 1, wherein the battery pack includes c battery modules arranged in a direction in which the accommodated battery cells are oriented,
   wherein the c is an integer between 2 and m,
   wherein a second electrode lead at an end portion of a r-th battery module and a first electrode lead at an end portion of a (r+1)-th battery module are joined at a position where the second electrode lead and the first electrode lead face each other,
   wherein the r is an integer between 1 and (c−1),
   wherein the reinforcing pole is disposed in a direction perpendicular to a direction in which the battery cells are oriented, and
   wherein the reinforcing pole occupies a dead space adjacent to a portion where the second electrode lead at the end portion of the r-th battery module and the first electrode lead at the end portion of the (r+1)-th battery module are joined.

5. The battery pack of claim 1, wherein the battery pack has a structure where two or more battery modules are accommodated in a direction in which the reinforcing pole is formed, and
   wherein the reinforcing pole penetrates the two or more battery modules.

6. The battery pack of claim 1, further comprising a reinforcing bar disposed in a direction perpendicular to a direction in which the reinforcing pole is formed.

7. The battery pack of claim 6, wherein a cross-section of the reinforcing pole has a circular, elliptical, or triangle shape, and
   wherein a cross-section of the reinforcing bar has a quadrangle or trapezoidal shape.

8. The battery pack of claim 1, further comprising first and second battery modules disposed in a direction perpendicular to a direction in which the accommodated battery cells are oriented,
   wherein the reinforcing pole penetrates the first and second battery modules.

9. The battery pack of claim 8, further comprising a reinforcing bar which is disposed between the first and second battery modules, and is positioned in a direction perpendicular to the reinforcing pole.

10. The battery pack of claim 1, further comprising: first and second battery modules arranged in a direction perpendicular to a direction in which the accommodated battery cells are oriented; and third and fourth battery modules arranged in parallel to the first and second battery modules, respectively,
    wherein the reinforcing pole is disposed to penetrate the first and third battery modules, penetrate the second and fourth battery modules, or pass a position between the first and second battery modules and a position between the third and fourth battery modules.

11. The battery pack of claim 10, further comprising a reinforcing bar which is disposed to pass a position between the first and third battery modules and a position between the second and fourth battery modules.

12. The battery pack of claim 9, further comprising a battery management system (BMS) located inside the battery pack.

13. A vehicle comprising the battery pack according to claim 1 as a power source.

* * * * *